United States Patent Office 3,158,824
Patented Nov. 24, 1964

3,158,824
TUBULAR WAVE GUIDE FOR TRANSMITTING CIRCULAR-ELECTRIC WAVES
Herbert Larsen, Munich, and Herbert Bauhof, Berlin-Spandau, Germany, assignors to Siemens & Halske Aktiengesellschaft, Berlin-Siemensstadt and Munich, Germany, a German corporation
Filed Mar. 25, 1958, Ser. No. 723,723
Claims priority, application Germany, Mar. 27, 1957, S 52,877
3 Claims. (Cl. 333—95)

Our invention relates to tubular wave guides for transmitting electromagnetic microwaves generally of the transverse circular-electric mode.

Modern developments, tending toward generating and propagating electromagnetic waves at progressively higher frequencies, have placed increasing emphasis upon the use of hollow pipe guides for transmitting the microwaves as carriers of signals. Particular attention in this respect is being given to the so-called "$TE_{01}$-type" tubular wave guides of circular or approximately circular cross section, because waves of the $TE_{01}$ or $TE_{0n}$ mode—that is, waves of a transverse and essentially circular-electric field configuration—possess the peculiar property, differing from that of other wave modes, that their attenuation decreases with increasing frequency. For that reason, the $TE_{01}$ waves, at kilomegacycle frequencies—already in use today—are particularly suitable for transmitting signals over great distances with only slight attenuation.

A trouble-free transmission of $TE_{01}$ waves, however, encounters difficulties mainly due to the fact that the $TE_{01}$ mode is unstable. Slight discontinuities or other irregularities in the tubular wave guide may suffice to cause splitting of the $TE_{01}$ wave into other wave modes. Particularly detrimental in this respect is a split-off $TM_{11}$ wave, i.e. the fundamental transverse circular-magnetic wave. This is because the $TM_{11}$ wave has the same propagation constant as the $TE_{01}$ wave so that the two wave modes are strongly coupled with each other, with the wave energy to be transmitted oscillating between the $TM_{11}$ wave and the $TE_{01}$ wave as energy carrier. For that reason, particular expedients and means are needed for minimizing the occurrence and propagation of a $TM_{11}$ wave in a wave guide intended for transmitting $TE_{01}$ waves.

It is known for this purpose to compose the tubular wave guide of serially aligned rings or of a wire formed as a helix. It has further been proposed to form a single or multiple-turn helix from flat strips wound on edge. In all such designs of $TE_{01}$ guides there occur narrow annular or helical slots between the individual rings or between the turns of the wire helix. The main function of such slots in the tubular wall is to give the $TM_{11}$ wave in the guide a phase constant greatly departing from that of the $TE_{01}$ wave, thus impeding the occurrence of the detrimental $TM_{11}$ wave and minimizing its coupling with the $TE_{01}$ wave. It is also known to place damping materials, consisting of dielectric substances of great loss angle or dissipation, into or above the slots of the tubular wall. This greatly increases the attenuation of the $TM_{11}$ wave relative to that of the $TE_{01}$ wave. As a consequence, and aside from the further reduced coupling between $TM_{11}$ and $TE_{01}$ waves, the $TM_{11}$ wave, or generally any TM wave, is strongly attenuated in the wave guide and thus is prevented from being propagated through the guide.*

Our invention, in a more specific aspect, relates to the above-mentioned tubular wave guides for transmitting microwaves of the transverse circular-electric mode, particularly $TE_{01}$ waves, whose tube wall has circular or helical slots covered toward the outside by a dielectric damping layer of high dissipation; and it is an object of our invention to further improve the damping effect of the closed slots relative to the detrimental TM waves.

It appears desirable, in general, to make the damping layer from a material of largest possible loss angle in order to keep the attenuation ratio of the detrimental TM waves to the $TE_{01}$ wave as great as possible. According to experience, however, greatly dissipative dielectric masses also have a relatively high dielectric constant so that appreciable reflection occurs at the boundary face between the medium in the hollow guide space, generally air, and the damping layer that closes the slots. As a result, a large percentage of the waves excited at the slot openings by a TE wave and penetrating into the slots, is reflected at the boundary face into the slots or into the hollow transmission space. Hence only a slight proportion of these waves penetrates into the damping layer to be absorbed therein. It is, therefore, a more specific object of our invention to devise a hollow-pipe wave guide in which the proportion of the wave excited at the slot openings by the TE waves and entering into the damping layer is considerably increased.

To this end, and in accordance with a feature of our invention, we provide beneath the exterior damping layer one or more dielectric intermediate layers whose (complex or real) dielectric constants are graduated between the dielectric constant of the medium, particularly air, in the hollow transmission space of the tubular guide, on the one hand, and the dielectric constant of the outer damping layer on the other hand.

According to a further, more specific, feature of our invention, the above-mentioned intermediate damping layers consist preferably of dielectric foam material whose degree of foam formation is chosen to obtain the above-mentioned graduated value of the dielectric constant together with the desired dissipating property.

The invention will be further explained with reference to the drawing, in which—

Figure 1:
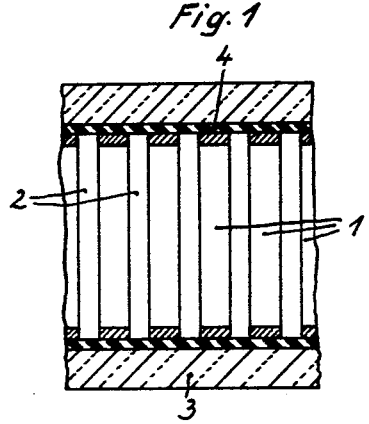
FIG. 1 shows a longitudinal section through a portion of a circular wave guide according to the invention.

In the embodiment according to FIG. 1, the tubular wave guide which encloses the air-filled transmission space proper, is composed of short and relatively thin annular metal pieces 1 of circular or approximately circular cross section. The individual tube pieces 1 are slightly spaced from each other so as to form narrow circular slots 2 whose longitudinal length in the chosen embodiment is shorter than the corresponding length of the tube pieces 1. The slots 2 are closed toward the outside by an outer damping layer 3 which, in the illustrated example, is formed as a closed sheath tightly enclosing the wave guide proper. Located between the outer damping layer 3 and the tubular wave guide is an intermediate dielectric layer 4, also forming a tube, whose dielectric constant has a value between the dielectric constant of the transmission medium and the dielectric constant of the outer damping layer 3.

Figure 2:
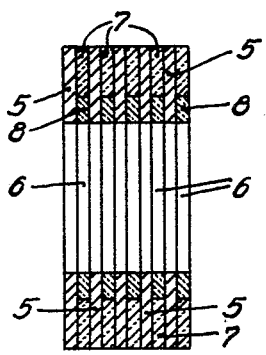
FIG. 2 shows another embodiment of a wave guide according to the invention also in longitudinal section through part of the guide.

In the $TE_{01}$ wave guide illustrated in FIG. 2, the guide proper is composed of individual flat ring-shaped metal discs 5 which are slightly spaced from each other in the longitudinal direction. In such a design of a wave guide, and as shown, the slots 6 between the ring-shaped discs

---

*For general subject matter and terminology, reference may be had to George G. Southworth, Principles and Applications of Wave Guide Transmissions, published 1950 by D. Van Nostrand Company, Inc., New York, pages 119 and following.

5 may be filled with dielectric material. The outer closure of the slots 6 is formed by a damping layer 7 of high loss angle. Located beneath this layer is an intermediate damping layer 8 whose dielectric constant has a value intermediate the respective dielectric constants of the medium in the hollow space of the wave guide and the outer damping layer 7.

The intermediate layers 4 and 8 in the two illustrated embodiments consist preferably of a dissipative material in the form of foam. By suitable choice of the foaming degree, the dielectric constant of the intermediate layer can be set to the desired value.

In principle, the dielectric intermediate layers can be calculated beforehand. For that purpose, it must be considered that the waves entering the slots are transverse waves, the electrical as well as the magnetical field vector extending transverse to the propagating direction, that is, perpendicular to the radial extent of the slots and hence parallel to the boundary faces between the individual media of stepwise different dielectric constants respectively. Based upon the condition that the transversal electric and the transversal magnetic field vectors are continuous at the boundary faces, an equation can be set up for the reflection coefficient which indicates which proportion of the waves entering into the slots is reflected back into the hollow transmission space. In this equation for the reflection coefficient, the dielectric constants and the thicknesses of the intermediate layers occur as parameter values which, in principle, can freely be chosen. Now, if it is required that the reflection coefficient be equal to zero, so that no waves are reflected back into the transmission space, then this requirement can be satisfied by suitable choice of the parameter values. The larger the number of intermediate layers, the larger is also the freedom in the choice of the parameter values. In principle, however, the provision of only one intermediate layer suffices to obtain freedom from reflection for a given frequency.

Figure 3:
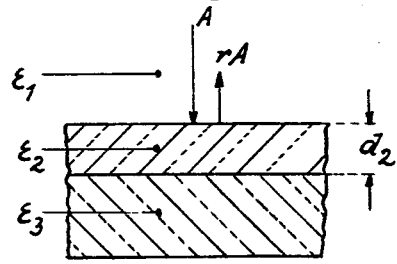
FIG. 3 is explanatory and relates to the layer arrangement in a microwave guide according to the invention.

This will be shown presently on the basis of the fundamental layer arrangement illustrated in FIG. 3.

Denoted in FIGS. 3 by $\epsilon_1$, $\epsilon_2$ and $\epsilon_3$ are three mutually adjacent media of respectively different dielectric constants, the terms $\epsilon_1$, $\epsilon_2$ and $\epsilon_3$ also denoting the corresponding relative dielectric constants of these media. In the $TE_{01}$ wave guides, the medium $\epsilon_1$ and the medium $\epsilon_3$ correspond to the medium of the hollow transmission space and to the outer damping layer respectively. Between these two there is located, according to the invention, the dielectric intermediate layer having a suitable dielectric constant $\epsilon_2$ and the thickness $d_2$.

In accordance with practical conditions, assume that the medium of the transmission space $\epsilon_1$ be air, so that $\epsilon_1 = 1$; and further that the damping layer $\epsilon_3$ be sufficiently thick and sufficiently dissipative to make all waves, penetrating into the layer, decay to zero after passing through a certain distance, so that no reflected waves can occur in the outer damping layer. Denoted by the arrow A is the transverse wave impinging upon the intermediate layer $\epsilon_2$ from the hollow transmission space, the length of arrow A indicating the amplitude of this wave. The wave reflected back into the transmission space is denoted by the arrow $rA$, the term $r$ also denoting the reflection coefficient.

On the foregoing assumption, the calculation results in the following equation for the reflection coefficient $r$:

(1)
$$r = \frac{(1-\sqrt{\epsilon_2})\left(1+\sqrt{\frac{\epsilon_2}{\epsilon_3}}\right)e^{jk_2d_2} + \left(\sqrt{\frac{\epsilon_2}{\epsilon_3}}-1\right)(1+\sqrt{\epsilon_2})e^{-jk_2d_2}}{(1+\sqrt{\epsilon_2})\left(1+\sqrt{\frac{\epsilon_2}{\epsilon_3}}\right)e^{jk_2d_2} + \left(\sqrt{\frac{\epsilon_2}{\epsilon_3}}-1\right)(1-\sqrt{\epsilon_2})e^{-jk_2d_2}}$$

with $$k_2 = \frac{2\pi}{\lambda}\sqrt{\epsilon_2}$$

and $\lambda$ = wave length in air.

The reflection becomes equal to zero when the enumerator is equal to zero. This is the case when the following complex equation is satisfied:

(2)
$$1-\sqrt{\epsilon_2} + \sqrt{\frac{\epsilon_2}{\epsilon_3}} - \frac{\epsilon_2}{\sqrt{\epsilon_3}} = \left(1+\sqrt{\epsilon_2}-\sqrt{\frac{\epsilon_2}{\epsilon_3}}-\frac{\epsilon_2}{\sqrt{\epsilon_3}}\right)e^{-2jk_2d_2}$$

For the case of the intermediate layer $\epsilon_2$ having low losses, so that $\epsilon_2 = \epsilon_2'$ is real in the mathematical sense, one obtains—by introducing the complex value for $\epsilon_3 = \epsilon_3'(1-j\tan\delta_3)$ and by separating the real term from the imaginary term— two real-term equations from which $\epsilon_2 = \epsilon_2'$ and $d_2$ can be determined for a given value of $\epsilon_3$. This can be done graphically, for instance. When the jump from $\epsilon_1 = 1$ to $\epsilon_3$ is very large so that, under the above assumption that $\epsilon_3$ is a real term, it may be found that the resulting value of $\epsilon_2 = \epsilon_2'$ is not realizable technically. In such case, however, there are two other possibilities of obtaining complete freedom from reflection.

One of these possibilities is the provision of further intermediate layers of respective graduated values of the respective dielectric constants, whose calculations can be carried out by a recursion method. This can be done to such an extent that, ultimately, the dielectric constant having the value $\epsilon_1 = 1$ gradually and continuously merges with the value $\epsilon_3$. Such a continuous passing from one to the other limit value has the advantage of wide-band matching but is difficult to carry out in practice. For that reason, the other possibility for reflection-free matching for a given frequency is preferable. This other possibility again resides in the provision of only one intermediate layer $\epsilon_2$ which, however, is permitted in this case to possess losses. If now the complex term for the dielectric constant $\epsilon_2 = \epsilon_2'(1-j\tan\delta_2)$ is introduced into the Equation 2 then the segregation into real and imaginary terms again results in two real-term equations in which now three magnitures, namely $\epsilon_2$, $\tan\delta_2$ and $d_2$, occur as the determining quantities. The value of one of these three terms can be freely chosen, namely always so that there results for $\epsilon_2'$ a value that is technically realizable.

In practice, the production of a reflection-free adaptation according to the invention amounts to providing at the boundary faces between the individual media a reflecting condition of such nature that the waves that travel within the laminated medium in the reverse direction act to compensate, at the boundary between the medium ($\epsilon_1$) of the hollow transmission space and the first intermediate layer ($\epsilon_2$), those waves that are reflected at this boundary face back into the hollow transmission space.

In microwave guides according to the invention, the guide structures proper, denoted in FIGS. 1 and 2 by 1 and 5, consist of conducting metal, preferably copper. The outer damping layer 3 or 7 may be made, for instance, of ethoxilene resin with admixed graphite; and the intermediate layers 4, 8 are preferably made of polystyrol foam.

The invention is not limited to the illustrated embodiments. It may be used with the same result in connection with $TE_{01}$ wave guides in which the slots are not circular as in FIGS. 1 and 2 but extend helically. It is further within the scope of the invention to give the dielectric layers an arrangement different from that illustrated. For example, in the embodiment shown in FIG. 1, the dielectric intermediate layer 4 may partly or entirely be located within the slots 2. Conversely, in the embodiment according to FIG. 2, it is not necessary to have the dielectric layers 7 and 8 completely fill the slots. For example, only the dielectric intermediate layer 8 may be located within the slots, whereas the outer damping layer 7 may form a closed hose or sheath which surrounds the hollow conductor formed by the rings 5. The cross section of the tubular wave guide need not be accurately circular. In certain cases it may be preferable to give the guide an only approximately circular, for instance elliptic, shape.

Such and other modifications will be obvious to those skilled in the art upon a study of this disclosure, and it will therefore be understood that the invention may be embodied in microwave guide structures other than those particularly described herein, without departing from the essential features of our invention and within the scope of the claims annexed hereto.

We claim:

1. Tubular wave guide for transmitting electromagnetic waves of the transverse circular-electric mode, particularly $TE_{01}$ waves, comprising peripheral portions jointly constituting an elongated tubular guide structure having a hollow and air-filled transmission space of round cross section, the cross-sections of said portions defined by a plane passing through the longitudinal axis of the wave guide being substantially rectangular and forming peripheral slots between each other, the tube wall of said guide structure being interrupted by said slots, an outer damping layer of dielectric material situated in the outer portions of said slots and having high wave-energy dissipation compared with said tubular structure, an intermediate dielectric layer situated in said slots inwardly of said damping layer and located between said outer layer and said space, said intermediate layer having a dielectric constant graduated between those of said outer layer and of said air in said transmission space respectively.

2. In a tubular wave guide according to claim 1, said intermediate layer means consisting of dielectric foam material.

3. In a tubular wave guide according to claim 1, said tubular guide structure comprising a multiplicity of co-axially aligned flat metal rings axially spaced from each other to form said slots and having a radial width larger than their axial thickness, and said intermediate layer means being located in said slots between said rings.

References Cited in the file of this patent

UNITED STATES PATENTS

| | | |
|---|---|---|
| 2,465,719 | Fernsler | Mar. 29, 1949 |
| 2,511,610 | Wheeler | June 13, 1950 |
| 2,538,771 | Feenberg | Jan. 23, 1951 |
| 2,557,261 | Collard | June 19, 1951 |
| 2,779,006 | Albersheim | Jan. 22, 1957 |
| 2,848,696 | Miller | Aug. 19, 1958 |